US012795484B2

(12) United States Patent
Wu et al.

(10) Patent No.: US 12,795,484 B2
(45) Date of Patent: Nov. 10, 2026

(54) METHODS AND APPARATUSES OF A MOBILITY ROBUSTNESS OPTIMIZATION MECHANISM FOR A CONDITIONAL HANDOVER PROCEDURE

(71) Applicant: Lenovo (Beijing) Limited, Beijing (CN)

(72) Inventors: Lianhai Wu, Beijing (CN); Mingzeng Dai, Shanghai (CN); Haiming Wang, Beijing (CN); Ran Yue, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 720 days.

(21) Appl. No.: 18/042,675

(22) PCT Filed: Sep. 25, 2020

(86) PCT No.: PCT/CN2020/117865
§ 371 (c)(1),
(2) Date: Feb. 23, 2023

(87) PCT Pub. No.: WO2022/061750
PCT Pub. Date: Mar. 31, 2022

(65) Prior Publication Data

US 2023/0362778 A1 Nov. 9, 2023

(51) Int. Cl.
*H04W 36/08* (2009.01)
*H04W 36/24* (2009.01)
(Continued)

(52) U.S. Cl.
CPC ......... *H04W 36/08* (2013.01); *H04W 36/249* (2023.05); *H04W 36/00835* (2018.08); *H04W 36/362* (2023.05)

(58) Field of Classification Search
CPC ............... H04W 36/08; H04W 36/249; H04W 36/00835; H04W 36/362; H04W 36/00833; H04W 36/0079
(Continued)

(56) References Cited

U.S. PATENT DOCUMENTS

| | | | |
|---|---|---|---|
| 2015/0031363 | A1 | 1/2015 | Kordybach et al. |
| 2016/0095025 | A1 | 3/2016 | Wegmann et al. |

(Continued)

FOREIGN PATENT DOCUMENTS

| | | | |
|---|---|---|---|
| CN | 110366212 | A | 10/2019 |
| CN | 111565426 | A | 8/2020 |

(Continued)

OTHER PUBLICATIONS

2023519235 , "Foreign Office Action", JP Application No. 2023519235, Jul. 30, 2024, 24 pages.

(Continued)

*Primary Examiner* — Marcos Batista
(74) *Attorney, Agent, or Firm* — FIG. 1 Patents

(57) ABSTRACT

Embodiments of the present application relate to methods and apparatuses for a mobility robustness optimization (MRO) mechanism for a conditional handover (CHO) procedure. According to an embodiment of the present application, a method can include: receiving CHO configuration information for a user equipment (UE), wherein the CHO configuration information is associated with one or more CHO candidate cells and includes a set of execution conditions corresponding to the one or more CHO candidate cells; performing a handover (HO) procedure associated with a target cell, in response to receiving a handover command from a source cell or performing a CHO procedure associated with a CHO candidate cell, in response to meeting an execution condition of the CHO candidate cell; starting a (Continued)

timer for HO procedure or CHO procedure; and in response to successfully accessing the target cell or the CHO candidate cell, stopping the timer and transmitting assistant information to the target cell or the CHO candidate cell. In response to failing to perform the HO procedure or the CHO procedure, the UE performs a re-establishment procedure and selects one cell. If the selected cell is CHO candidate cell, the UE performs a CHO procedure and stores the information regarding whether an execution condition for each of the one or more CHO candidate cells is met or not.

20 Claims, 5 Drawing Sheets

(51) Int. Cl.
*H04W 36/00* (2009.01)
*H04W 36/36* (2009.01)

(58) Field of Classification Search
USPC .......................................... 455/436; 370/338
See application file for complete search history.

(56) References Cited

U.S. PATENT DOCUMENTS

| | | | | |
|---|---|---|---|---|
| 2019/0223073 | A1 | 7/2019 | Chen et al. | |
| 2019/0387440 | A1 | 12/2019 | Yiu et al. | |
| 2020/0053600 | A1* | 2/2020 | Jang | H04W 72/1215 |
| 2021/0377831 | A1 | 12/2021 | Yan et al. | |
| 2022/0038976 | A1* | 2/2022 | Hwang | H04W 36/362 |
| 2022/0322163 | A1* | 10/2022 | Awada | H04W 36/0085 |
| 2023/0239752 | A1* | 7/2023 | Balan | H04W 36/0058 370/331 |

FOREIGN PATENT DOCUMENTS

| | | | |
|---|---|---|---|
| EP | 3917213 | A1 | 12/2021 |
| JP | 2022520966 | A | 4/2022 |
| JP | 2022522631 | A | 4/2022 |
| WO | 2020163991 | A1 | 8/2020 |
| WO | 2020164365 | A1 | 8/2020 |
| WO | 2022021015 | A1 | 2/2022 |

OTHER PUBLICATIONS

3GPP , "NR; NR and NG-RAN Overall Description; Stage 2 (Release 16)", 3rd Generation Partnership Project; Technical Specification Group Radio Access Network, Jul. 24, 2020, pp. 7-38.
"Notice of Allowance", JP Application No. 2023-519235, Jul. 8, 2025, 9 pages.
"Foreign Office Action", JP Application No. 2023519235, Jan. 16, 2025, 17 pages.
20954602.7 , "European Search Report", Application No. 20954602.7, May 8, 2024, 15 pages.
CMCC , "Mobility optimization enhancement", 3GPP TSG-RAN WG3 Meeting #109-e R3-205446 Mobile Competence Centre ; 650, Route Des Lucioles ; F-06921 Sophia-Antipolis Cedex ; France, Aug. 17, 2020, 5 pages.
Lenovo , et al., "RLF report for CHO MRO", 3GPP TSG-RAN WG3 Meeting #109e R3-204918 Mobile Competence Centre ; 650, Route Des Lucioles ; F-06921 Sophia-Antipolis Cedex ; France, Aug. 17, 2020, 4 pages.
PCT/CN2020/117865 , "International Preliminary Report on Patentability", PCT Application No. PCT/ CN2020/117865, Apr. 6, 2023, 5 pages.
PCT/CN2020/117865 , "International Search Report and Written Opinion", PCT Application No. PCT/CN2020/117865, Jun. 23, 2021, 6 pages.
Samsung , et al., "Discussion on Performing CHO instead of RRE in CHO", 3GPP TSG-RAN WG2 Meeting #107bis, R2-1913908, Chongqing, China [retrieved Mar. 15, 2023]. Retrieved from the Internet <https://www.3gpp.org/ftp/tsg_ran/WG2_RL2/TSGR2_107bis/Docs>., Sep. 2019, 4 Pages.
Foreign Office Action issued in CN 202080105233.1, mailed Jul. 20, 2026, 24 pages.

* cited by examiner

METHODS AND APPARATUSES OF A MOBILITY ROBUSTNESS OPTIMIZATION MECHANISM FOR A CONDITIONAL HANDOVER PROCEDURE

TECHNICAL FIELD

Embodiments of the present application generally relate to wireless communication technology, in particular to methods and apparatuses of a mobility robustness optimization (MRO) mechanism for a conditional handover (CHO) procedure.

BACKGROUND

A base station (BS) can have some cells (or areas) to provide communication service. When a user equipment (UE) moves from a serving cell of a source BS to a target cell of a target BS, a handover procedure is performed.

When a radio link failure (RLF) or a handover (HO) failure occurs for a UE, the UE may perform a radio resource control (RRC) re-establishment procedure. The UE may access a cell by a successful RRC re-establishment procedure. The accessed network will request UE information including a RLF report of the UE, such that the network can optimize the mobility problem based on the UE information from the UE. Accordingly, the UE will transmit a failure report to the network.

The 3rd Generation Partnership Project (3GPP) 5G system or network adopts a MRO mechanism. However, details regarding a MRO mechanism for a CHO procedure have not been discussed in 3GPP 5G technology yet.

SUMMARY

Some embodiments of the present application provide a method, which may be performed by a UE. The method includes: receiving CHO configuration information for a UE, wherein the CHO configuration information is associated with one or more CHO candidate cells and includes a set of execution conditions corresponding to the one or more CHO candidate cells, and wherein the UE is in a RRC connected state; performing a HO procedure associated with a target cell, in response to receiving a handover command from a source cell or performing a CHO procedure associated with a CHO candidate cell, in response to meeting an execution condition of the CHO candidate cell; starting a timer for HO procedure or CHO procedure; and in response to successfully accessing the target cell or the CHO candidate cell, stopping the timer and transmitting assistant information to the target cell or the CHO candidate cell.

Some embodiments of the present application provide a further method, which may be performed by a UE. The method includes: receiving CHO configuration information for a UE, wherein the CHO configuration information is associated with one or more CHO candidate cells and includes a set of execution conditions corresponding to the one or more CHO candidate cells, wherein the UE is in a RRC connected state; in response to an occurrence of a failure, performing a RRC re-establishment procedure, wherein the failure is one of a RLF, a HO failure, and a CHO failure; selecting a first cell; in response to the first cell being configured with CHO configuration information, performing a CHO procedure; and storing information regarding whether an execution condition for each of the one or more CHO candidate cells is met or not.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
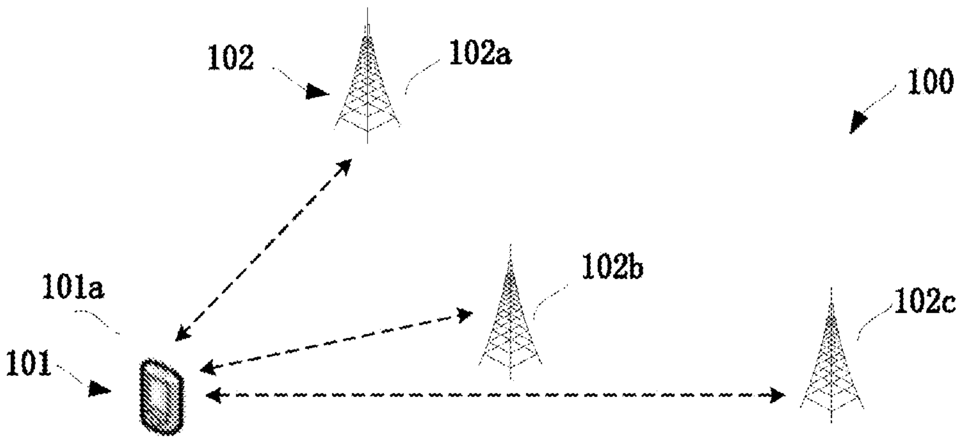
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes one UE 101 (e.g., UE 101*a*) and three BSs 102 (e.g., BS 102*a*, BS 102*b*, and BS 102*c*) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of transmitting and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be deployed an IoT application, an eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of transmitting and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G of the 3GPP protocol, wherein BS(s) 102 transmit data using an OFDM modulation scheme on the downlink (DL) and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

Each BS(s) 102 may include one or more cells. Each UE(s) 101 may perform a cell section procedure between different cell(s) of different BS(s). Each UE(s) 101 may handover from a serving cell of a source BS to a target cell of a target BS. For example, in the wireless communication system 100 as illustrated and shown in FIG. 1, BS 102*a* may function as a source BS, and each of BS 102*b* and BS 102*c* may function as a target BS. If there is a handover need, UE 101*a* as illustrated and shown in FIG. 1 may perform a handover procedure from a serving cell of BS 102*a* to a target cell of BS 102*b* or a target cell of BS 102*c*, which depends a result of a cell selection procedure. The handover procedure performed by UE 101*a* may be a conditional handover (CHO) procedure.

As specified in 3GPP standard documents, CHO is defined as a handover that is executed by a UE when one or more handover execution conditions are met. The UE starts evaluating the execution condition(s) upon receiving the CHO configuration, and stops evaluating the execution condition(s) during the CHO procedure once the execution condition(s) is met.

According to 3GPP standard documents, the following principles are applicable for CHO:

- The CHO configuration contains configuration of CHO candidate cell(s) generated by candidate BS(s) and execution condition(s) generated by the source BS.
- An execution condition may consist of one or two trigger condition(s) (e.g., Event A3 or Event A5). Only single reference signal (RS) type is supported and at most two different execution quantities (e.g., RSRP (reference signal received power) and RSRQ (reference signal received quality), RSRP and SINR (signal to interference plus noise ratio), etc.) can be configured simultaneously for the evaluation of CHO execution condition of a single candidate cell.
  - Event A3: a neighbour cell of a UE becomes offset better than a source cell of the UE; and
  - Event A5: a source cell of a UE becomes worse than one threshold and a neighbour cell of the UE becomes better than another threshold.
- Before any CHO execution condition is satisfied, upon reception of a HO command (without any CHO configuration), the UE executes a HO procedure, regardless of any previously received CHO configuration.

While performing a CHO procedure, i.e., from the time instance when the UE starts synchronization with a target cell, the UE does not monitor the source cell.

Figure 2:
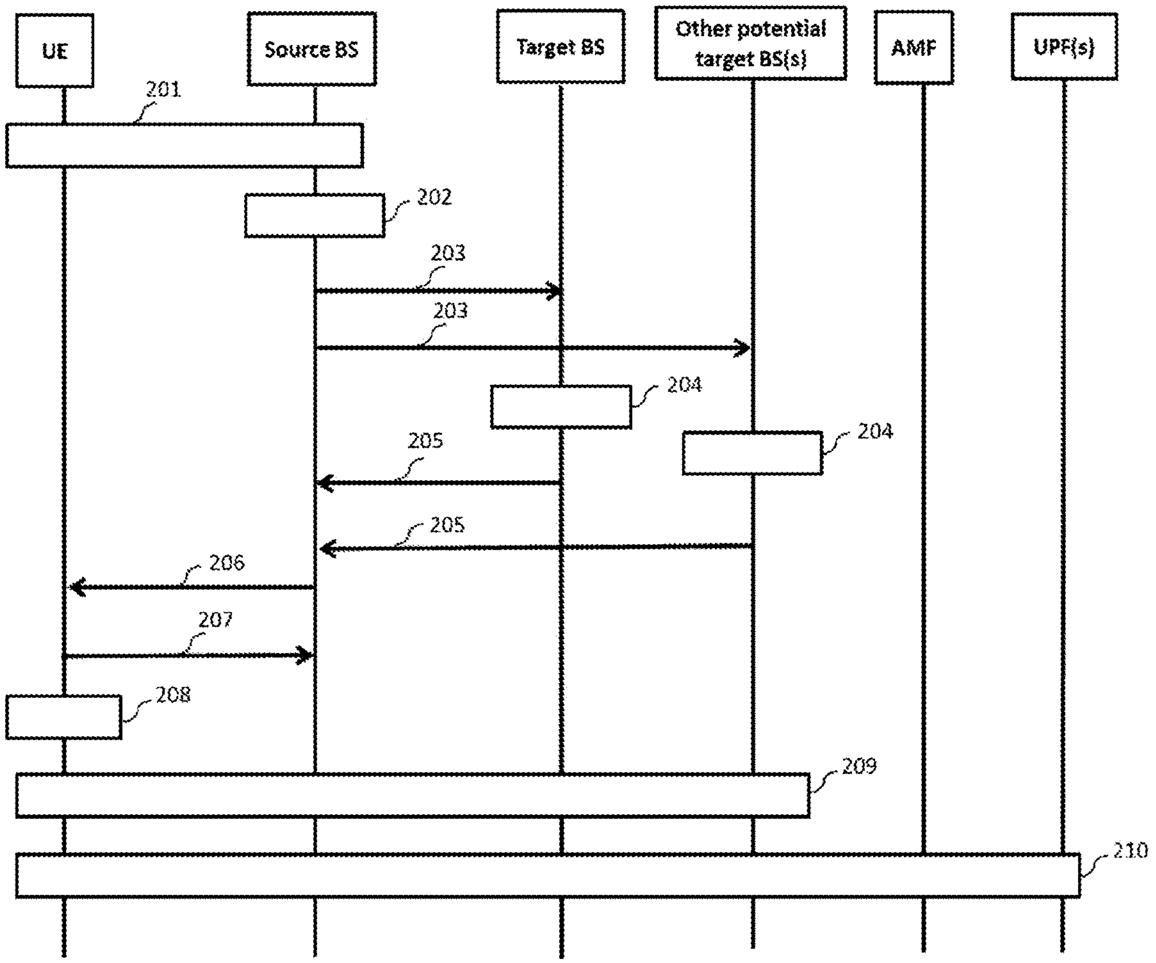
FIG. 2 illustrates an exemplary flowchart of an intra-AMF/UPF conditional handover procedure in accordance with some embodiments of the present application.

FIG. 2 illustrates an exemplary flowchart of an intra-AMF/UPF conditional handover procedure in accordance with some embodiments of the present application. The embodiments of FIG. 2 depict a basic conditional handover scenario where neither an access and mobility management function (AMF) nor a user plane function (UPF) changes.

Referring to FIG. 2, in operation 201, a source BS (e.g., BS 102*a* as illustrated and shown in FIG. 1) may transmit measurement configuration information to a UE (e.g., UE 101*a* as illustrated and shown in FIG. 1), and the UE may report a measurement result to the source BS based on the measurement configuration information. In operation 202, the source BS may decide to use a CHO procedure of the UE, which is based on the measurement result reported by the UE.

In operation 203, the source BS may transmit CHO REQUEST message to one target BS (e.g., BS 102*b* as illustrated and shown in FIG. 1) and other potential target BS(s) (e.g., BS 102*c* as illustrated and shown in FIG. 1). In operation 204, the target BS or other potential target BS(s) may perform an admission control based on the load of a target cell of the target BS or other potential target BS(s), to decide whether to allow the CHO procedure of the UE after receiving the CHO REQUEST message from the source BS.

In operation 205, based on an admission control result, the target BS or other potential target BS(s) may prepare handover resource(s) for the UE and send CHO REQUEST ACKNOWLEDGE message to the source BS.

In operation 206, the source BS may transmit RRCReconfiguration message to the UE. The RRCReconfiguration message may include configuration information of CHO candidate cell(s) and the corresponding CHO execution condition(s).

In operation 207, the UE may transmit RRCReconfigurationComplete message to the source BS. In operation 208, the UE may evaluate the CHO condition(s). If one of the CHO candidate cells satisfies the CHO execution condition(s), the UE may detach from the source cell and synchronize to the CHO candidate cell which satisfies the CHO execution condition(s).

In operation 209, the UE may transmit a CHO completion message to the target BS or other potential target BS(s). In operation 210, the 5G network may switch the DL data path towards the target BS or other potential target BS(s). Any ongoing data forwarding may continue.

As specified in 3GPP standard documents, MRO is for detecting connection failure(s) that occur due to Too Early or Too Late Handovers, or Handover to Wrong Cell. The general procedure is that after a RLF or a HO failure happens, a UE access a new cell by RRC re-establishment or connection setup. Once the UE enters a RRC connected state, the UE transmits a RLF report and a RACH report to the serving cell. The serving cell will transmit a failure indication including a RLF report to the last serving cell. Finally, the information is used to optimize the mobility.

Regarding the abovementioned function of MRO, the problems of Too Early or Too Late Handovers, or Handover to Wrong Cell are defined as follows:

[Intra-system Too Late Handover] A RLF occurs after the UE has stayed for a long period of time in the cell; and the UE attempts to re-establish the radio link connection in a different cell.

[Intra-system Too Early Handover] A RLF occurs shortly after a successful handover from a source cell to a target cell or a handover failure occurs during the handover procedure; and the UE attempts to re-establish the radio link connection in the source cell.

[Intra-system Handover to Wrong Cell] A RLF occurs shortly after a successful handover from a source cell to a target cell or a handover failure occurs during the handover procedure; and the UE attempts to re-establish the radio link connection in a cell other than the source cell and the target cell.

In the above definitions, the "successful handover" refers to the UE's state, i.e., the successful completion of the radio access (RA) procedure.

Generally, in a UE information procedure, after a RLF or a HO failure occurs, a UE may perform a RRC re-establishment procedure in a cell. The UE will store some information related with the RLF failure and/or the HO failure. The UE stores the latest RLF Report, including both LTE and NR RLF report until the RLF report is fetched by the network or for 48 hours after the connection failure is detected. For analysis of connection failure(s), the UE makes the RLF report available to the network.

Figure 3:
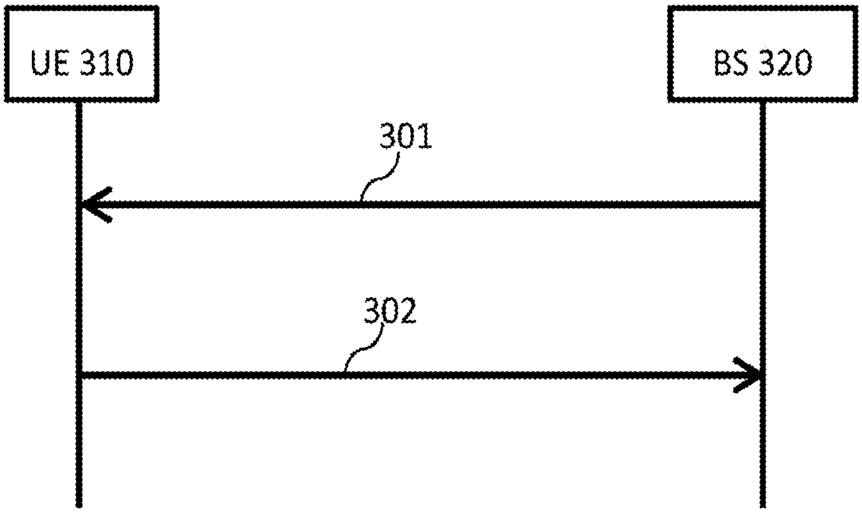
FIG. 3 illustrates an exemplary UE information procedure in accordance with some embodiments of the present application.

FIG. 3 illustrates an exemplary UE information procedure in accordance with some embodiments of the present application. The embodiments of FIG. 3 show a procedure of a UE (e.g., UE 310) communicating with a BS (e.g., BS 320). In some examples, UE 310 may function as UE 101*a* in FIG. 1. BS 320 may function as BS 102*a*, BS 102*b*, or BS 102*c* in FIG. 1.

As shown in FIG. 3, in operation 301, BS 320 (e.g., BS 102*a* as illustrated and shown in FIG. 1) transmits UEInformationRequest message to UE 310 (e.g., UE 101*a* as illustrated and shown in FIG. 1). BS 320 may be a source BS which controls a serving cell of UE 310. In operation 302, US 310 transmits UEInformationResponse message including a RLF report to BS 320. BS 320 can optimize a mobility problem based on the response transmitted from UE 310.

Figure 4:
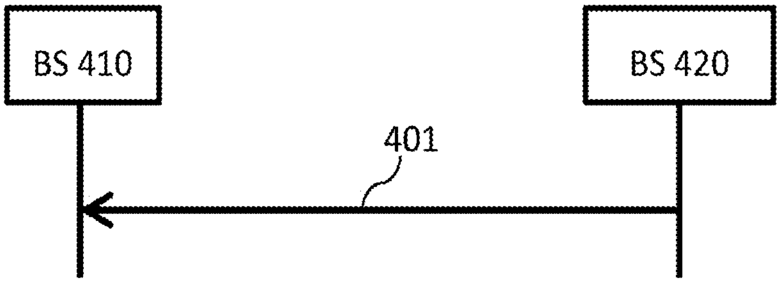
FIG. 4 illustrates an exemplary failure indication procedure in accordance with some embodiments of the present application.

In a 3GPP 5G system, a failure indication may be initiated after a UE attempts to re-establish the radio link connection at NG-RAN node B (e.g., BS 420 in FIG. 4) after a failure at NG-RAN node A (e.g., BS 410 in FIG. 4). NG-RAN node B (e.g., BS 420 in FIG. 4) may initiate a failure indication procedure towards multiple NG-RAN nodes if they control cells which use a physical cell identifier (PCI) signaled by the UE during the RRC re-establishment procedure. A failure indication may also be sent to the node last serving the UE when the NG-RAN node fetches the RLF report from the UE. A specific example of a failure indication procedure is described in FIG. 4.

The purpose of the failure indication procedure is to transfer information regarding RRC re-establishment attempts, or received RLF reports, between NG-RAN nodes. The signaling takes place from the NG-RAN node at which a re-establishment attempt is made, or a RLF report is received, to an NG-RAN node to which the UE concerned may have previously been attached prior to the connection failure. This may aid the detection of a RLF case or a HO failure case.

FIG. 4 illustrates an exemplary failure indication procedure in accordance with some embodiments of the present application. The embodiments of FIG. 4 show a procedure of one BS (e.g., BS 410) communicating with another BS (e.g., BS 420). In some examples, BS 410 or BS 420 may function as BS 102*a*, BS 102*b*, or BS 102*c* in FIG. 1.

As shown in FIG. 4, in operation 401, BS 420 transmits a failure indication message to BS 410. BS 410 is a source BS which controls the original serving cell of a UE (e.g., UE 101*a* as illustrated and shown in FIG. 1). BS 420 is a target BS or a new BS which controls a target cell or a CHO candidate cell of the UE. The failure indication message may be transmitted by Xn interface or X2 interface. For example, the failure indication message includes a container of a RLF report. The container of the RLF report may be transmitted by Xn interface or X2 interface.

The following table shows introductions of some timers as specified in 3GPP standard documents, including a starting condition, a stop condition, an operation at expiry, and a possible general name for each of these timers.

| Timer | Start | Stop | At expiry | Name |
|---|---|---|---|---|
| T304 | Upon reception of a RRCReconfiguration message including reconfigurationWith Sync or upon conditional reconfiguration execution i.e., when applying a stored RRCReconfiguration message including reconfigurationWith Sync. | Upon successful completion of random access on the corresponding SpCell For T304 of SCG, upon SCG release | For T304 of MCG, in case of the handover from NR or intra-NR handover, initiate the RRC re-establishment procedure; In case of handover to NR, perform the actions defined in the specifications applicable for the source RAT. For T304 of SCG, inform network about the reconfiguration with sync failure by initiating the SCG failure information procedure as specified in sub-clause 5.7.3 of TS 38.331. | a Handover timer |
| T311 | Upon initiating the RRC connection re-establishment procedure | Upon selection of a suitable NR cell or a cell using another RAT. | Enter into a RRC_IDLE state | a timer for RRC connection re-establishment |

Figure 5:
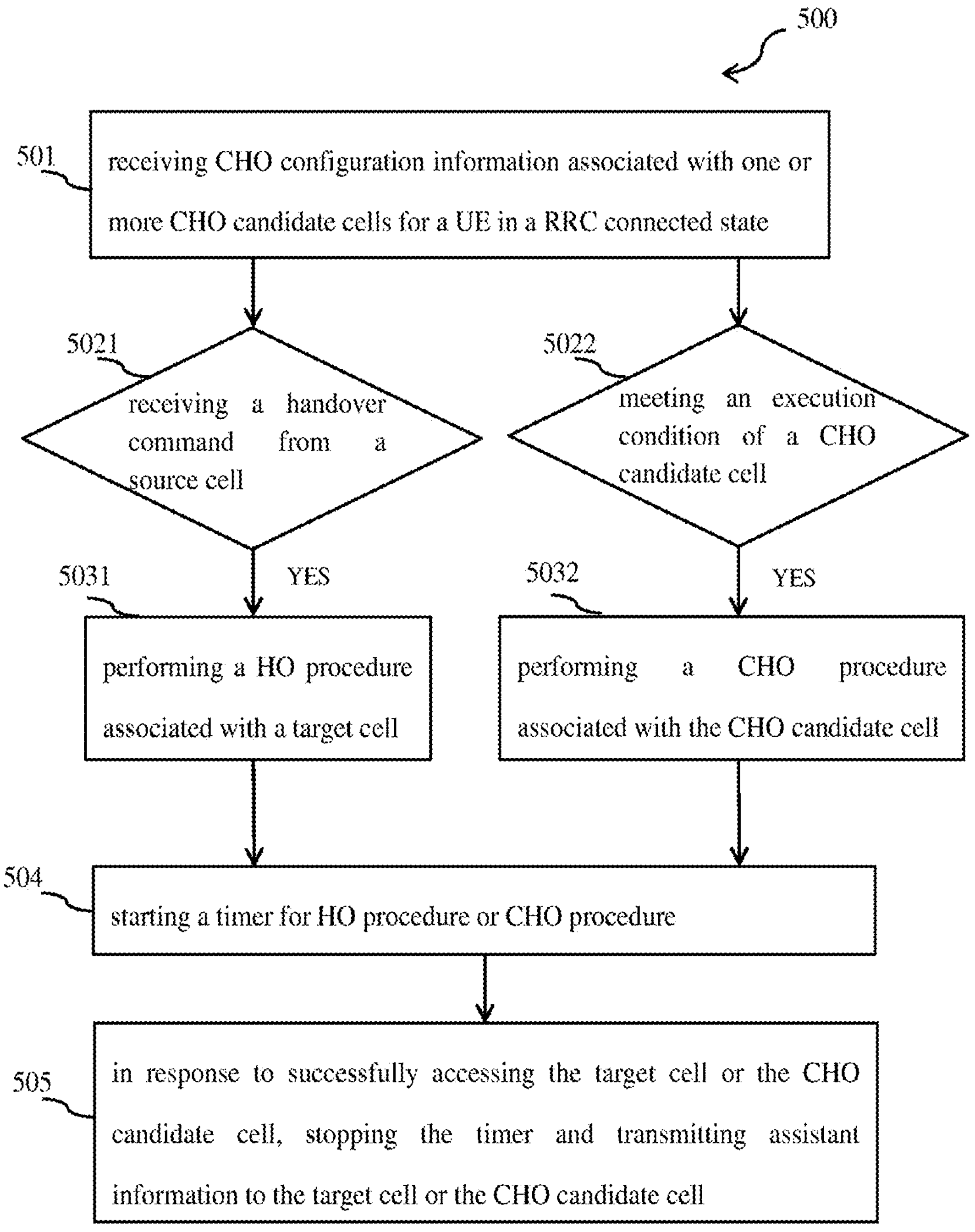
FIG. 5 illustrates an exemplary flow chart of a method for transmitting assistant information in accordance with some embodiments of the present application.

FIG. 5 illustrates an exemplary flow chart of a method for transmitting assistant information in accordance with some embodiments of the present application. The method 500 may be performed by a UE (e.g., UE 101, the UE, or UE 310 as shown and illustrated in any of FIGS. 1-3). Although described with respect to a UE, it should be understood that other devices may be configured to perform a method similar to that of FIG. 5.

In the exemplary method 500 as shown in FIG. 5, in operation 501, a UE (e.g., UE 101 as shown and illustrated in FIG. 1) receives receiving CHO configuration information associated with one or more CHO candidate cells for the UE, and the UE is in a RRC connected state. A RRC connected state may also be named as RRC connection state, RRC CONNECTION state, RRC_CONNECTION state, RRC_CONNECTED state, RRC_Connected state, or the like.

In operation 5021, the UE determines whether a handover command is received from a source cell. In operation 5031, if "YES", i.e., the UE receives a handover command from a source cell, the UE performs a HO procedure associated with a target cell.

In operation 5022, the UE determines whether an execution condition of a CHO candidate cell is met. In operation 5032, if "YES", i.e., if an execution condition of a CHO candidate cell is met, the UE performs a CHO procedure associated with the CHO candidate cell.

In operation 504, the UE starts a timer for HO procedure or CHO procedure. In operation 505, if the UE successfully accesses the target cell via the HO procedure or if the UE successfully accesses the CHO candidate cell via the CHO procedure, the UE stops the timer for HO procedure or CHO procedure and transmits assistant information to the target cell or the CHO candidate cell.

In an embodiment, after the UE successfully completes the HO procedure or the CHO procedure, the UE transmits an indication to the target cell or the CHO candidate cell, and the indication indicates that a state of the assistant information is available. The indication may also be named as "an indication of an available state of assistant information". For instance, the indication indicates at least one of:

(1) failure information being available;
(2) successful HO procedure information being available; and
(3) successful CHO procedure information being available.

In an embodiment, after successfully completing of the HO procedure, the UE receives a UE information request message from the target cell and then transmits a UE information response message to the target cell. The UE information response message includes the assistant information.

In a further embodiment, after successfully completing of the CHO procedure, the UE receives a UE information request message from the CHO candidate cell and then transmits a UE information response message to the CHO candidate cell. The UE information response message includes the assistant information.

According to some embodiments, after successfully completing a HO procedure, the UE reports CHO related information to the serving cell. According to some further embodiments, after successfully completing a HO procedure, the UE reports other information not associated with a CHO procedure to the serving cell. According to some other embodiments, after successfully completing a CHO procedure, the UE reports CHO related information or other information not associated with the CHO procedure to the serving cell. The information reported by the UE in all these embodiments may be named as assistant information.

For instance, the assistant information transmitted by the UE may include at least one of following information or a combination thereof.

In an embodiment, the assistant information includes: a set of identity information regarding one or more CHO candidate cells of the UE; and a set of execution conditions corresponding to the one or more CHO candidate cells.

In a further embodiment, if two conditions are configured to one CHO candidate cell within one or more CHO candidate cells of the UE, the assistant information includes an indication to indicate whether one condition within these two conditions is met or whether no condition within these two conditions is met.

For example, following two conditions may be configured to one CHO candidate cell. In this example, the assistant information may include an indication to indicate that "only Event A3 is met", "only Event A5 is met", or "neither Event A3 nor Event A5 is met".

In another embodiment, the assistant information includes: a time to trigger (TTT) value corresponding to an execution condition of each CHO candidate cell of one or more CHO candidate cells.

In yet another embodiment, the assistant information includes a measurement result for each CHO candidate cell of one or more CHO candidate cells.

In yet another embodiment, the assistant information includes:

a time length of a handover timer, wherein the time length is configured by control signaling, for example, from a network (e.g., a BS); and a duration length of a handover timer from a time instance of starting the handover timer to a time instance of stopping the handover timer.

For example, the handover timer is timer T304 as specified in 3GPP standard documents. The assistant information includes: a time length of timer T304 configured by control signaling from a BS, and an actual duration length of timer T304 from a time instance of starting T304 to a time instance of actually stopping timer T304.

In yet another embodiment, the assistant information includes a time duration between "a time instance of receiving firstly transmitted CHO configuration information associated with one CHO candidate cell within one or more CHO candidate cells" and "a time instance of starting to perform a HO procedure or a CHO procedure".

In yet another embodiment, the assistant information includes a time duration between "a time instance of receiving lastly transmitted CHO configuration information associated with one CHO candidate cell within one or more CHO candidate cells" and "a time instance of starting to perform a HO procedure or a CHO procedure".

In yet another embodiment, the assistant information includes a measurement result for each of one or more serving beams of the UE.

In yet another embodiment, the assistant information includes a state of each serving beam of one or more serving beams of the UE during the UE performing the HO procedure or the CHO procedure. The state of each serving beam may be failed or available.

According to some embodiments, a BS of the target cell of the UE transmits a failure indication message to a BS of the source cell, e.g., via Xn interface. According to some other embodiments, a BS of the CHO candidate cell of the UE transmits a failure indication message to a BS of the source cell, e.g., via Xn interface. The failure indication message may include an indication, to indicate "a successful completion of the HO procedure" or "a successful completion of the CHO procedure". For short, "a successful completion of the HO procedure" may be named as "a successful HO procedure" or the like. For short, "a successful completion of the CHO procedure" may be named as "a successful CHO procedure" or the like.

The following texts describe specific Embodiments 1 and 2 of the method as shown and illustrated in FIG. 5.

Embodiment 1

According to Embodiment 1, a UE (e.g., UE 101, the UE, or UE 310 as shown and illustrated in any of FIGS. 1-3) and a BS (e.g., BS 102*a*, BS 102*b*, BS 102*c*, a source BS, a target BS, BS 320, BS 410, or BS 420 as illustrated and shown in any of FIG. 1-4) perform the following operations:

(1) Step 1: The UE is in a RRC_Connected state. The BS configures the UE to report a measurement result.

The UE will report the measurement result based on the configuration information received from the BS.

(2) Step 2: The UE is configured with CHO configuration associated with one or more CHO candidate cells based on the measurement result.

The UE continues to perform a measurement procedure.

(3) Step 3: The UE reports the measurement result based on the configuration information.

The BS can determine, based on the measurement result from the UE, if the UE should perform a HO procedure or not. The BS may decide to perform a HO procedure if a CHO procedure is not triggered.

(4) Step 4: The UE receives a HO command from a source cell.

The configuration information from the target cell is included in the HO command.

(5) Step 5: After the UE receives the HO command, the UE performs a HO procedure. Then, the UE accesses the target cell and stops timer T304.

After the UE accesses the target cell, the HO procedure is successfully completed, which means a successful handover.

(6) Step 6: The UE transmits RRCReconfigurationComplete message to a target BS. The RRCReconfigurationComplete message includes an indication to indicate that assistant information is available, which may also be named as an assistant information available indication.

The assistant information available indication could be a random access information available indication, a failure information available indication, or a successful HO information available indication. The successful HO information available indication indicates that the HO procedure is successfully completed.

(7) Step 7: After receiving the assistant information available indication from the UE, the target BS transmits UEInformationRequest message to the UE.

(8) Step 8: The UE transmits UEInformationResponse message to the target BS.

The following information may be included in the UEInformationResponse message:

CHO related information may be reported to the serving cell after a successful HO procedure. The CHO related information may include at least one of:

1) A CHO candidate cell list and the corresponding execution condition(s).

2) If a combination of Event A3 and Event A5 is configured, the UE needs to further indicate if one of Event A3 and Event A5 has been met already.

3) A TTT value: this value to be reported aims to help the source cell to set a suitable TTT value.

4) A measurement result for the corresponding CHO candidate cell. The measurement result may be mandatory to be reported.

5) The value of timer T304 and the timer instance when the UE stops the timer T304.

6) A time duration between "a time instance of receiving firstly transmitted CHO configuration associated with the initial candidate cell" and "a time instance of starting to perform the HO procedure to the accessed target cell".

7) A time duration between "a time instance of receiving lastly transmitted CHO configuration associated with the initial candidate cell" and "a time instance of starting to perform the HO procedure to the accessed target cell".

Other information not associate with CHO may be reported to the serving cell.

1) As usual, the BS will configure one set of serving beams to the UE. The set may include one or more serving beams. The UE can indicate a measurement result of each serving beam in the set of serving beams.

2) Alternatively, the UE can indicate which serving beam within the set of serving beams is "failure" or "available" when the UE performs the HO procedure.

(9) Step 9: After the target BS receives the UEInformationResponse message from the UE, the target BS will transmit a failure indication message to the source BS using Xn interface.

The UEInformationResponse message reported by the UE may be transmitted as a container.

An indication of "a successful completion of the HO procedure" may be included in the failure indication message.

Embodiment 2

According to Embodiment 2, a UE (e.g., UE 101, the UE, or UE 310 as shown and illustrated in any of FIGS. 1-3) and a BS (e.g., BS 102*a*, BS 102*b*, BS 102*c*, a source BS, a target BS, BS 320, BS 410, or BS 420 as illustrated and shown in any of FIG. 1-4) perform the following operations:

(1) Step 1: The UE is in a RRC_Connected state. The BS configures the UE to report a measurement result.

The UE will report the measurement result based on the configuration information received from the BS.

(2) Step 2: The UE is configured with CHO configuration associated with one or more CHO candidate cells based on the measurement result.

The UE continues to perform a measurement procedure.

(3) Step 3: The UE performs a CHO procedure, once one execution condition for one CHO candidate cell is met. Then, the UE accesses the CHO candidate cell and stops timer T304.

After the UE accesses the CHO candidate cell, the CHO procedure is successfully completed, which means a successful handover.

(4) Step 4: The UE transmit RRCReconfigurationComplete message to a target BS. The RRCReconfigurationComplete message includes an indication to indicate that assistant information is available, which may also be named as an assistant information available indication.

The assistant information available indication could be a random access information available indication, a failure information available indication, or a successful CHO information available indication. The successful CHO information available indication indicates that the CHO procedure is successfully completed.

(5) Step 5: After receiving the assistant information available indication from the UE, the target BS transmits UEInformationRequest message to the UE.

(6) Step 6: The UE transmits UEInformationResponse message to the target BS.

the following information is included in UEInformationResponse message

CHO related information may be reported to the serving cell after a successful CHO procedure The CHO related information may include at least one of:

1) A CHO candidate cell list and the corresponding execution condition(s).

2) If a combination of Event A3 and Event A5 is configured, the UE needs to further indicate if one of Event A3 and Event A5 has been met already.

3) A TTT value: this value to be reported aims to help the source cell to set a suitable TTT value.

4) A measurement result for the corresponding CHO candidate cell. The measurement result may be mandatory to be reported.

5) The value of timer T304 and the timer instance when the UE stops the timer T304.

6) A time duration between "a time instance of receiving firstly transmitted CHO configuration associated with the initial candidate cell" and "a time instance of starting to perform the CHO procedure to the accessed CHO candidate cell".

7) A time duration between "a time instance of receiving lastly transmitted CHO configuration associated with the initial candidate cell" and "a time instance of starting to perform the CHO procedure to the accessed CHO candidate cell".

Other information not associate with CHO may be reported to the serving cell.

1) As usual, the BS will configure one set of serving beams to the UE. The set may include one or more serving beams. The UE can indicate a measurement result of each serving beam in the set of serving beams.

2) Alternatively, the UE can indicate which serving beam within the set of serving beams is "failure" or "available" when the UE performs the CHO procedure.

(7) Step 7: After the target BS receives the UEInformationResponse message from the UE, the target BS will transmit a failure indication message to the source BS using Xn interface.

The UEInformationResponse message reported by the UE may be transmitted as a container.

The indication of "a successful completion of the CHO procedure" may be included in the failure indication message.

Details described in all other embodiments of the present application (for example, details of a MRO mechanism for a CHO procedure and the transmitted assistant information) are applicable for the embodiments of FIG. 5. Moreover, details described in the embodiments of FIG. 5 are applicable for all the embodiments of FIGS. 1-4, 6, and 7.

Under some scenarios, if a CHO failure or a HO failure occurs, a UE performs a CHO procedure. This CHO procedure may be named as a CHO recovery procedure to some extents. There may be two cases, one case is that the UE successfully completes the CHO procedure, and the other case is that the UE unsuccessfully completes the CHO procedure. In these two cases, the UE needs to report some related information. Specific examples are described in the embodiments of FIG. 6.

Figure 6:
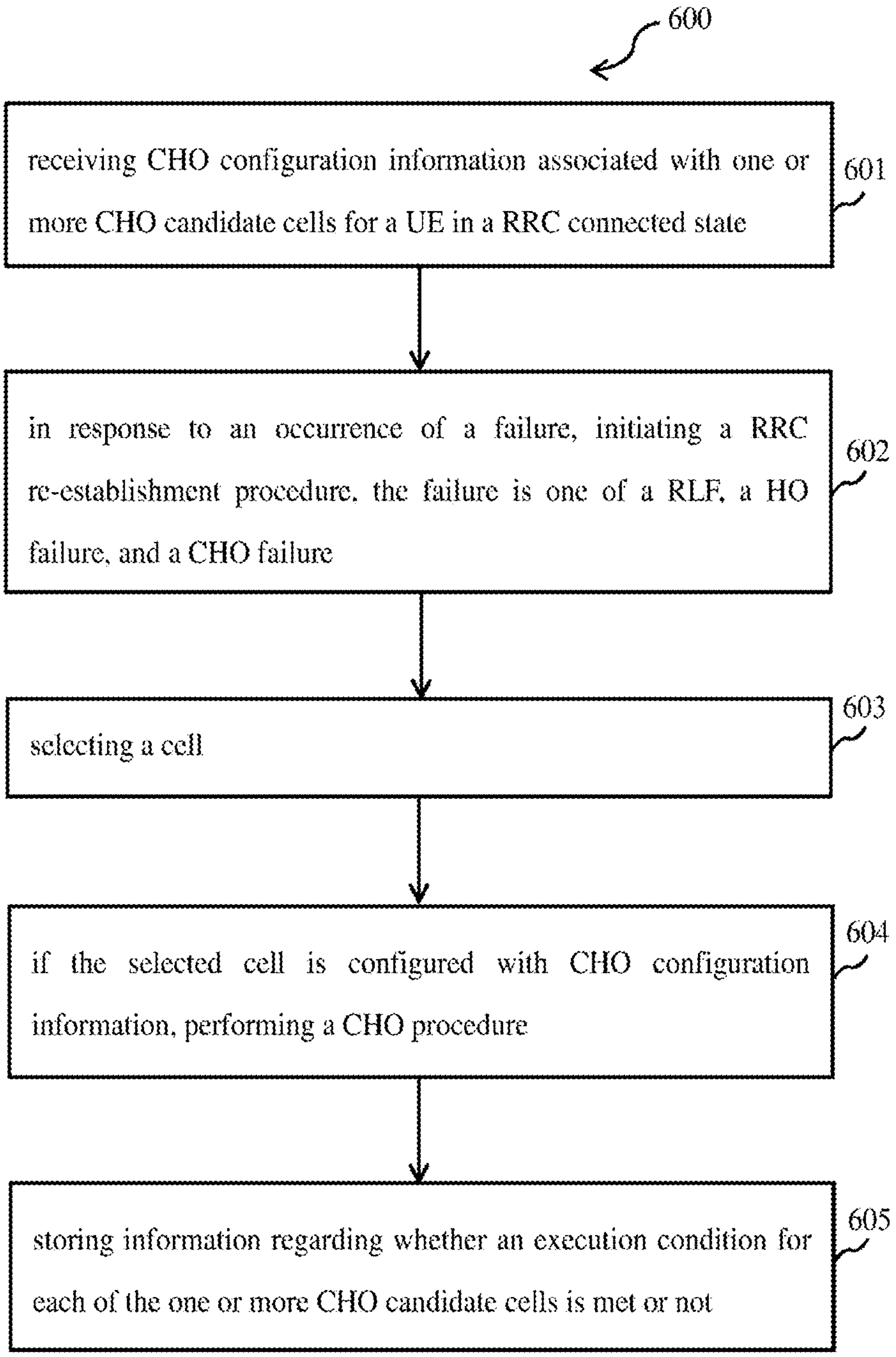
FIG. 6 illustrates an exemplary flow chart of a method for performing a CHO procedure in accordance with some embodiments of the present application.

FIG. 6 illustrates an exemplary flow chart of a method for performing a CHO procedure in accordance with some embodiments of the present application. The method 600 may be performed by a UE (e.g., UE 101, the UE, or UE 310 as shown and illustrated in any of FIGS. 1-3). Although described with respect to a UE, it should be understood that other devices may be configured to perform a method similar to that of FIG. 6.

In the exemplary method 600 as shown in FIG. 6, in operation 601, a UE (e.g., UE 101 as shown and illustrated in FIG. 1) receives CHO configuration information associated with one or more CHO candidate cells for the UE, and the UE is in a RRC connected state.

In operation 602, upon an occurrence of a failure, the UE initiates a RRC re-establishment procedure. The failure may be one of a RLF, a HO failure, and a CHO failure.

In operation 603, the UE selects a cell, e.g., by performing a cell selection procedure. In operation 604, if the selected cell is configured with CHO configuration information, the UE performs a CHO procedure.

In operation 605, the UE stores information regarding whether an execution condition for each CHO candidate cell within one or more CHO candidate cells is met or not.

In an embodiment, if the UE successfully completes the CHO procedure, the UE transmits, to the selected cell, an indication of an available state of assistant information. The indication may also be named as an assistant information available indication. For instance, the indication may be included in RRCReconfigurationComplete message.

In an example, the UE further receives a UE information request message from the selected cell and transmits a UE information response message to the selected cell. The UE information response message includes the assistant information.

In a further embodiment, if the UE does not successfully complete the CHO procedure, the UE selects another cell. The UE may transmit a RRC re-establishment request to the abovementioned another cell. The UE may further transmit the assistant information available indication to the abovementioned another cell, in response to successful completing the RRC re-establishment procedure which is initiated in the operation 602 as shown and illustrated in FIG. 6.

In an example, the UE further receives a UE information request message from the abovementioned another cell and transmits the UE information response message to the abovementioned another cell. The UE information response message includes the assistant information.

In both embodiments that the UE successfully completes the CHO procedure and the UE does not successfully complete the CHO procedure, the assistant information available indication may be at least one of:

(1) failure information being available; and (2) information regarding successfully completing the CHO procedure being available. The CHO procedure (e.g., in the operation 604 as shown and illustrated in FIG. 6) is performed by the UE after the UE initiates the RRC re-establishment procedure (e.g., in the operation 602 as shown and illustrated in FIG. 6).

According to some embodiments, a BS of the selected cell of the UE transmits a failure indication message to a BS of the source cell, e.g., via Xn interface. According to some other embodiments, a BS of the abovementioned another selected cell of the UE transmits a failure indication message to a BS of the source cell, e.g., via Xn interface. The failure indication message may include an indication, to indicate "a successful CHO procedure after initiating the RRC re-establishment procedure" or "a failed CHO procedure after initiating the RRC re-establishment procedure". For short, "a successful CHO procedure after initiating the RRC re-establishment procedure" may be named as "a successful CHO recovery procedure" or the like. For short, "a failed CHO procedure after initiating the RRC re-establishment procedure" may be named as "a failed CHO recovery procedure" or the like.

According to some embodiments, the assistant information includes at least one of:

(1) a set of identity information regarding one subset of CHO candidate cell within one or more CHO candidate cells, wherein an execution condition for each CHO candidate cell of this subset of CHO candidate cell is met during the CHO procedure (e.g., in the operation 604 as shown and illustrated in FIG. 6); and (2) a set of identity information regarding another subset of CHO candidate cell within the one or more CHO candidate cells, wherein an execution condition for each CHO candidate cell of this another subset of CHO candidate cell is not met during the CHO procedure (e.g., in the operation 604 as shown and illustrated in FIG. 6).

According to some other embodiments, the assistant information includes at least one of:

(1) a set of identity information regarding one or more CHO candidate cells;

(2) a set of execution conditions corresponding to one or more CHO candidate cells;

(3) an indication to indicate whether one condition (e.g., Event A3 or Event A5) within two conditions (e.g., Event A3 and Event A5) or no condition within these two conditions is met, if these two conditions are configured to one CHO candidate cell within one or more CHO candidate cells;

(4) a TTT value corresponding to an execution condition of each CHO candidate cell of one or more CHO candidate cells;

(5) a measurement result for each CHO candidate cell of one or more CHO candidate cells;

(6) a time length of a handover timer (e.g., timer T304 as specified in 3GPP standard documents), wherein the time length is configured by control signaling, for example, from a network (e.g., a BS); and (7) an actual duration length of the handover timer (e.g., timer T304) from a time instance of starting the handover timer to a time instance of actually stopping the handover timer.

The following texts describe specific Embodiments 3 and 4 of the method as shown and illustrated in FIG. 6.

Embodiment 3

In Embodiment 3, a UE successfully completes a CHO recovery procedure. According to Embodiment 3, a UE (e.g., UE 101, the UE, or UE 310 as shown and illustrated in any of FIGS. 1-3) and a BS (e.g., BS 102*a*, BS 102*b*, BS 102*c*, a source BS, a target BS, BS 320, BS 410, or BS 420 as illustrated and shown in any of FIG. 1-4) perform the following operations in "a successful CHO recovery procedure":

(1) Step 1: A UE in a RRC_Connected state is configured with CHO configuration information. One of following three failures happens in the UE:
 a RLF;
 a HO failure; and
 a CHO failure.

(2) Step 2: Once the failure happens, the UE performs a cell selection procedure and starts timer T311 for the cell selection procedure.

(3) Step 3: If the selected cell is configured with CHO configuration information, the UE access the selected cell by a subsequent CHO procedure.
 The UE stops timer T311.
 The UE stores the information whether an execution condition for each CHO candidate cell is met or not.

(4) Step 4: If UE successfully accesses the selected cell, the UE transmits RRCReconfigurationComplete message to a target BS. The RRCReconfigurationComplete message includes an indication to indicate that assistant information is available.
 The assistant information available indication could be an indication of indicating random access information being available, failure information being available, or successful CHO recovery information being available (which indicates that the CHO recovery procedure is successfully completed).

(5) Step 5: The target BS transmits UEInformationRequest message to the UE.

(6) Step 6: The UE transmit UEInformationResponse message to the target BS.
 The UEInformationResponse message includes the following information:
  a CHO candidate cell meeting an execution condition during the CHO recovery procedure.
  a CHO candidate cell not meeting an execution condition during the CHO recovery procedure.

(7) Step 7: After the target BS receives the UEInformationResponse message from the UE, the target BS will transmit a failure indication message to the source BS using Xn interface.
 The UEInformationResponse message reported by the UE may be transmitted as a container.
 The indication of "Successful CHO recovery procedure" is included in the failure indication message.

Embodiment 4

In Embodiment 4, a UE does not successfully complete a CHO recovery procedure. According to Embodiment 4, a UE (e.g., UE 101, the UE, or UE 310 as shown and illustrated in any of FIGS. 1-3) and a BS (e.g., BS 102*a*, BS 102*b*, BS 102*c*, a source BS, a target BS, BS 320, BS 410, or BS 420 as illustrated and shown in any of FIG. 1-4) perform the following operations in "a failed CHO recovery procedure".

(1) Step 1: A UE in a RRC_Connected state is configured with CHO configuration information. One of three failures happens in the UE:
 a RLF;
 a HO failure; and
 a CHO failure.

(2) Step 2: The UE performs a cell selection procedure once the failure happens.

(3) Step 3: If the selected cell is configured with CHO configuration information, the UE access this selected cell by performing a CHO procedure.
 The UE stores the information whether an execution condition for each CHO candidate cell is met or not.

(4) Step 4: If the UE fails to access the selected cell, e.g., upon an expiry of timer T304, the UE performs a RRC re-establishment procedure and selects a new suitable cell.

(5) Step 5: The UE transmits RRCReestablishmentRequest message to the selected cell. After the UE successfully accesses the cell, the UE transmits RRCReestablishmentComplete message, which includes an indication to indicate that assistant information is available, i.e., an assistant information available indication.

(6) Step 6: The target BS transmits UE Information Request message to the UE after receiving the assistant information available indication.

(7) Step 7: The UE transmits UEInformationResponse message to the target BS.
 The UEInformationResponse message includes the following information:
  a CHO candidate cell meeting an execution condition during the CHO recovery procedure.
  a CHO candidate cell not meeting an execution condition during the CHO recovery procedure.

(8) Step 8: After the target BS receives the UEInformationResponse message from the UE, the target BS will transmit a failure indication message to the source BS using Xn interface.
 The UEInformationResponse message reported by the UE may be transmitted as a container.
 The indication of "failed CHO recovery procedure" is included in the failure indication message.

Details described in all other embodiments of the present application (for example, details of a MRO mechanism for a CHO procedure and the transmitted assistant information) are applicable for the embodiments of FIG. 6. Moreover, details described in the embodiments of FIG. 6 are applicable for all the embodiments of FIGS. 1-5 and 7.

Figure 7:
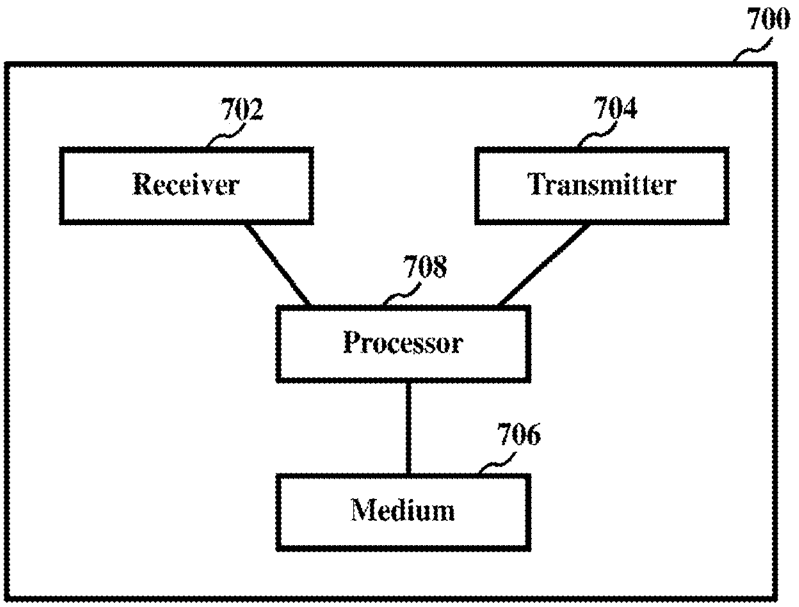
FIG. 7 illustrates an exemplary block diagram of an apparatus according to some embodiments of the present application.

FIG. 7 illustrates an exemplary block diagram of an apparatus according to some embodiments of the present application. In some embodiments of the present application, the apparatus 700 may be a UE, which can at least perform the method illustrated in FIG. 5 or FIG. 6.

As shown in FIG. 7, the apparatus 700 may include at least one receiver 702, at least one transmitter 704, at least one non-transitory computer-readable medium 706, and at least one processor 708 coupled to the at least one receiver 702, the at least one transmitter 704, and the at least one non-transitory computer-readable medium 706.

Although in FIG. 7, elements such as the at least one receiver 702, the at least one transmitter 704, the at least one non-transitory computer-readable medium 706, and the at least one processor 708 are described in the singular, the plural is contemplated unless limitation to the singular is explicitly stated. In some embodiments of the present application, the at least one receiver 702 and the at least one transmitter 704 are combined into a single device, such as a transceiver. In certain embodiments of the present application, the apparatus 700 may further include an input device, a memory, and/or other components.

In some embodiments of the present application, the at least one non-transitory computer-readable medium 706 may have stored thereon computer-executable instructions which are programmed to implement the operations of the methods, for example as described in view of any of FIGS.

5 and 6, with the at least one receiver 702, the at least one transmitter 704, and the at least one processor 708.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method performed by a user equipment (UE), the method comprising:

receiving conditional handover (CHO) configuration information for the UE, wherein the CHO configuration information is associated with one or more CHO candidate cells and includes a set of execution conditions corresponding to the one or more CHO candidate cells, and wherein the UE is in a radio resource control (RRC) connected state;

performing:

a handover (HO) procedure associated with a target cell, in response to receiving a handover command from a source cell; or a CHO procedure associated with a CHO candidate cell, in response to meeting an execution condition of the CHO candidate cell;

starting a timer for the HO procedure or the CHO procedure; and in response to successfully accessing the target cell or the CHO candidate cell, stopping the timer and transmitting assistant information to the target cell or the CHO candidate cell, the assistant information comprising:

a set of identity information regarding the one or more CHO candidate cells;

the set of execution conditions corresponding to the one or more CHO candidate cells;

a time to trigger (TTT) value corresponding to at least one execution condition of the one or more CHO candidate cells; and a measurement result for at least one of the one or more CHO candidate cells.

2. The method of claim 1, further comprising:

in response to successfully completing the HO procedure or the CHO procedure, transmitting, to the target cell or the CHO candidate cell, an indication of an available state of the assistant information.

3. The method of claim 2, wherein the indication includes at least one of:

failure information being available;

successful HO procedure information being available; and successful CHO procedure information being available.

4. The method of claim 2, wherein transmitting the assistant information further comprises:

receiving a UE information request message from the target cell after successfully completing the HO procedure, or receiving the UE information request message from the CHO candidate cell after successfully completing the CHO procedure; and transmitting a UE information response message to the target cell or the CHO candidate cell, wherein the UE information response message includes the assistant information.

5. The method of claim 1, wherein the assistant information further includes at least one of:

an indication to indicate whether one condition within two conditions or no condition within the two conditions is met, in response to the two conditions being configured to one CHO candidate cell within the one or more CHO candidate cells;

a time length of a handover timer, wherein the time length is configured by control signaling;

a duration length of the handover timer from a time instance of starting the handover timer to a time instance of stopping the handover timer;

a time duration between: a time instance of receiving firstly transmitted CHO configuration information associated with one CHO candidate cell within the one or more CHO candidate cells, and a time instance of starting to perform the HO procedure or the CHO procedure; and a time duration between: a time instance of receiving lastly transmitted CHO configuration information associated with one CHO candidate cell within the one or more CHO candidate cells, and a time instance of starting to perform the HO procedure or the CHO procedure.

6. The method of claim 1, wherein the assistant information includes at least one of:

a measurement result for each of one or more serving beams of the UE; and a state of each of the one or more serving beams during performing the HO procedure or the CHO procedure, wherein the state is failed or available.

7. A user equipment (UE) for wireless communication, comprising:

at least one memory; and at least one processor coupled with the at least one memory and operable to cause the UE to:

receive conditional handover (CHO) configuration information for the UE, wherein the CHO configuration information is associated with one or more CHO candidate cells and includes a set of execution conditions corresponding to the one or more CHO candidate cells, wherein the UE is in a radio resource control (RRC) connected state;

initiate, in response to an occurrence of a failure, a RRC re-establishment procedure, wherein the failure is one of a radio link failure (RLF), a handover (HO) failure, and a CHO failure;

select a first cell;

perform, in response to the first cell being configured with CHO configuration information, a CHO procedure; and store in a failure report:

a set of identity information regarding the one or more CHO candidate cells;

the set of execution conditions corresponding to the one or more CHO candidate cells;

a time to trigger (TTT) value corresponding to at least one execution condition of the one or more CHO candidate cells; and a measurement result for at least one of the one or more CHO candidate cells.

8. The UE of claim 7, wherein the at least one processor is further operable to cause the UE to:

transmit to the first cell, in response to successfully completing the CHO procedure, an indication of an available state of assistant information.

9. The UE of claim 8, wherein the indication is at least one of:

failure information being available; and information regarding successfully completing the CHO procedure being available, wherein the CHO procedure is performed after initiating an RRC re-establishment procedure.

10. The UE of claim 8, wherein the at least one processor is further operable to cause the UE to:

receive a UE information request message from the first cell and transmit a UE information response message to the first cell; or receive the UE information request message from a second cell and transmit the UE information response message to the second cell, wherein the UE information response message includes the assistant information.

11. The UE of claim 7, wherein the at least one processor is further operable to cause the UE to, in response to not successfully completing the CHO procedure:

select a second cell;

transmit a RRC re-establishment request to the second cell; and transmit, to the second cell, an indication of an available state of assistant information in response to successfully completing the RRC re-establishment procedure.

12. The UE of claim 11, wherein the indication is at least one of:

failure information being available; and information regarding successfully completing the CHO procedure being available, wherein the CHO procedure is performed after initiating an RRC re-establishment procedure.

13. The UE of claim 11, wherein the at least one processor is further operable to cause the UE to:

receive a UE information request message from the first cell and transmit a UE information response message to the first cell; or receive the UE information request message from the second cell and transmit the UE information response message to the second cell, wherein the UE information response message includes the assistant information.

14. The UE of claim 13, wherein a failure indication message is transmitted from a base station (BS) of one of the first cell and the second cell to a BS of a source cell, wherein the failure indication message includes an indication, and wherein the indication includes one of:

a successful CHO procedure after initiating the RRC re-establishment procedure; and a failed CHO procedure after initiating the RRC re-establishment procedure.

15. A user equipment (UE) for wireless communication, comprising:

at least one memory; and at least one processor coupled with the at least one memory and operable to cause the UE to:

receive conditional handover (CHO) configuration information for the UE, wherein the CHO configuration information is associated with one or more CHO candidate cells and includes a set of execution conditions corresponding to the one or more CHO candidate cells, and wherein the UE is in a radio resource control (RRC) connected state;

perform:

a handover (HO) procedure associated with a target cell in response to receiving a handover command from a source cell; or a CHO procedure associated with a CHO candidate cell in response to meeting an execution condition of the CHO candidate cell;

start a timer for the HO procedure or the CHO procedure; and in response to successfully accessing the target cell or the CHO candidate cell, stop the timer and transmit assistant information to the target cell or the CHO candidate cell, the assistant information comprising:

a set of identity information regarding the one or more CHO candidate cells;

the set of execution conditions corresponding to the one or more CHO candidate cells;

a time to trigger (TTT) value corresponding to at least one execution condition of the one or more CHO candidate cells; and a measurement result for at least one of the one or more CHO candidate cells.

16. The UE of claim 15, wherein the at least one processor is further operable to cause the UE to:

in response to successfully completing the HO procedure or the CHO procedure, transmit, to the target cell or the CHO candidate cell, an indication of an available state of the assistant information.

17. The UE of claim 16, wherein the indication includes at least one of:

failure information being available;

successful HO procedure information being available; and successful CHO procedure information being available.

18. The UE of claim 16, wherein to transmit the assistant information is further to:

receive a UE information request message from the target cell after successfully completing the HO procedure, or receive the UE information request message from the CHO candidate cell after successfully completing the CHO procedure; and transmit a UE information response message to the target cell or the CHO candidate cell, wherein the UE information response message includes the assistant information.

19. The UE of claim 15, wherein the assistant information includes at least one of:

an indication to indicate whether one condition within two conditions or no condition within the two conditions is met, in response to the two conditions being configured to one CHO candidate cell within the one or more CHO candidate cells;

a time length of a handover timer, wherein the time length is configured by control signaling;

a duration length of the handover timer from a time instance of starting the handover timer to a time instance of stopping the handover timer;

a time duration between: a time instance of receiving firstly transmitted CHO configuration information associated with one CHO candidate cell within the one or more CHO candidate cells, and a time instance of starting to perform the HO procedure or the CHO procedure; and a time duration between: a time instance of receiving lastly transmitted CHO configuration information associated with one CHO candidate cell within the one or more CHO candidate cells, and a time instance of starting to perform the HO procedure or the CHO procedure.

20. The UE of claim 15, wherein the assistant information includes at least one of:

a measurement result for each of one or more serving beams of the UE; and a state of each of the one or more serving beams during performing the HO procedure or the CHO procedure, wherein the state is failed or available.

* * * * *